(12) United States Patent
Kohama (10) Patent No.: US 11,979,540 B2
(45) Date of Patent: May 7, 2024

(54) IMAGE READING SYSTEM, IMAGE READING METHOD, NON-TRANSITORY COMPUTER-READABLE STORAGE MEDIUM FOR CORRECTING A SIZE AND POSITION OF AN IMAGE TO BE DISPLAYED

(71) Applicant: SEIKO EPSON CORPORATION, Tokyo (JP)

(72) Inventor: Yuji Kohama, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/145,946

(22) Filed: Dec. 23, 2022

(65) Prior Publication Data
US 2023/0208999 A1 Jun. 29, 2023

(30) Foreign Application Priority Data
Dec. 28, 2021 (JP) ................................. 2021-214475

(51) Int. Cl.
*H04N 1/387* (2006.01)
*H04N 1/00* (2006.01)
*H04N 1/393* (2006.01)

(52) U.S. Cl.
CPC ......... *H04N 1/3877* (2013.01); *H04N 1/0057* (2013.01); *H04N 1/00809* (2013.01); *H04N 1/393* (2013.01)

(58) Field of Classification Search
None
See application file for complete search history.

(56) References Cited

U.S. PATENT DOCUMENTS

| 5,079,624 A * | 1/1992 | Sasuga | H04N 1/60 358/521 |
| 8,687,230 B2 * | 4/2014 | Kondo | H04N 1/60 358/1.9 |
| 2007/0258661 A1 * | 11/2007 | Koshi | H04N 1/40068 358/1.11 |
| 2012/0262737 A1 * | 10/2012 | Beegle | H04N 1/0044 358/1.9 |
| 2015/0009518 A1 * | 1/2015 | Kashiwagi | H04N 1/00755 358/1.13 |

(Continued)

FOREIGN PATENT DOCUMENTS

| JP | 2018-133693 A | 8/2018 |
| JP | 2019-075600 A | 5/2019 |

*Primary Examiner* — Miya J Cato
*Assistant Examiner* — Pawan Dhingra
(74) *Attorney, Agent, or Firm* — WORKMAN NYDEGGER (57) ABSTRACT

An image reading system includes an image reading apparatus including a transport unit configured to transport a document from a bundle of cut documents one by one, a reading unit configured to read an image of the transported document, and a reading control unit, and an external control unit included in an external device coupled to the image reading apparatus, wherein an inclination correction process that corrects an inclination of the image of the document, a size determination process that determines a size of the image as a standard for the bundle of documents, and a size correction process that corrects the size of the image of the document to a specific size determined by the size determination process are performed.

14 Claims, 4 Drawing Sheets

(56) References Cited

U.S. PATENT DOCUMENTS

| | | | |
|---|---|---|---|
| 2016/0014290 A1* | 1/2016 | Mizuno | H04N 1/3875 |
| | | | 358/1.2 |
| 2018/0229956 A1* | 8/2018 | Yoshimura | B65H 7/20 |
| 2019/0112139 A1* | 4/2019 | Hirayama | H04N 1/00002 |
| 2022/0311891 A1* | 9/2022 | Yokogawa | H04N 1/04 |

* cited by examiner

IMAGE READING SYSTEM, IMAGE READING METHOD, NON-TRANSITORY COMPUTER-READABLE STORAGE MEDIUM FOR CORRECTING A SIZE AND POSITION OF AN IMAGE TO BE DISPLAYED

The present application is based on, and claims priority from JP Application Serial Number 2021-214475, filed Dec. 28, 2021, the disclosure of which is hereby incorporated by reference herein in its entirety.

BACKGROUND

1. Technical Field

The present disclosure relates to an image reading system, an image reading method, and a non-transitory computer-readable storage medium storing a program, and an image reading apparatus.

2. Related Art

For example, as described in JP-A-2018-133693, there is an image reading apparatus that reads an image of a document. The image reading apparatus can read an image of a cut document. In the cut document, a cut side may have a non-rectangular angle. Thus, the image reading apparatus performs an inclination correction of the read image based on an amount of inclination of the side forming a right angle.

When a plurality of documents is cut, it is difficult to match cutting positions thereof. Even when a bundle of documents is cut together, it is difficult to cut straight in a direction in which the documents overlap. Therefore, the plurality of documents constituting the bundle of documents are different in size. When images read from the plurality of documents are displayed on, for example, a monitor or the like, there is a possibility that sizes of the images and positions at which the images are displayed may be shifted.

SUMMARY

An image reading system that solves the problem described above is an image reading system including an image reading apparatus including a transport unit configured to transport a document from a bundle of cut documents one by one, a reading unit configured to read an image of the transported document, and a reading control unit, and an external control unit included in an external device coupled to the image reading apparatus, wherein an inclination correction process that corrects an inclination of the image of the document, a size determination process that determines a size of the image as a standard for the bundle of documents, and a size correction process that corrects the size of the image of the document to a specific size determined by the size determination process are performed.

An image reading method to solve the problem described above includes correcting an inclination of an image of a document read by an image reading apparatus including a transport unit configured to transport a document from a bundle of cut documents one by one and a reading unit configured to read an image of the transported document, determining a specific size of the image as a standard for the bundle of documents, and correcting a size of the image of the document to the specific size.

A non-transitory computer-readable storage medium storing a program to solve the problem described above is a non-transitory computer-readable storage medium storing a program processed by a computer provided in an image reading apparatus including a transport unit configured to transport a document from a bundle of cut documents one by one, and a reading unit configured to read an image of the transported document, and an external device coupled to the image reading apparatus, wherein correcting an inclination of an image of a read document, determining a specific size of the image as a standard for the bundle of documents, and correcting a size of the image of the document to the specific size are performed.

An image reading apparatus that solves the problem described above includes a transport unit configured to transport a document from a bundle of cut documents one by one, a reading unit configured to read an image of the transported document, and a reading control unit, wherein the reading control unit performs an inclination correction process that corrects an inclination of the image of the document, a size determination process that determines a size of the image as a standard for the bundle of documents, and a size correction process that corrects the size of the image of the document to a specific size determined by the size determination process.

DESCRIPTION OF EXEMPLARY EMBODIMENTS

First Embodiment

An image reading system, an image reading method, and a non-transitory computer-readable storage medium storing a program, and an image reading apparatus are described below with reference to the drawings. The image reading apparatus is, for example, a sheet feed scanner in which a fixed reading unit reads a transported document of such as paper, film, and the like. The image reading apparatus is not limited to a sheet feed scanner, and may be a flatbed scanner.

Image Reading System

Figure 1:
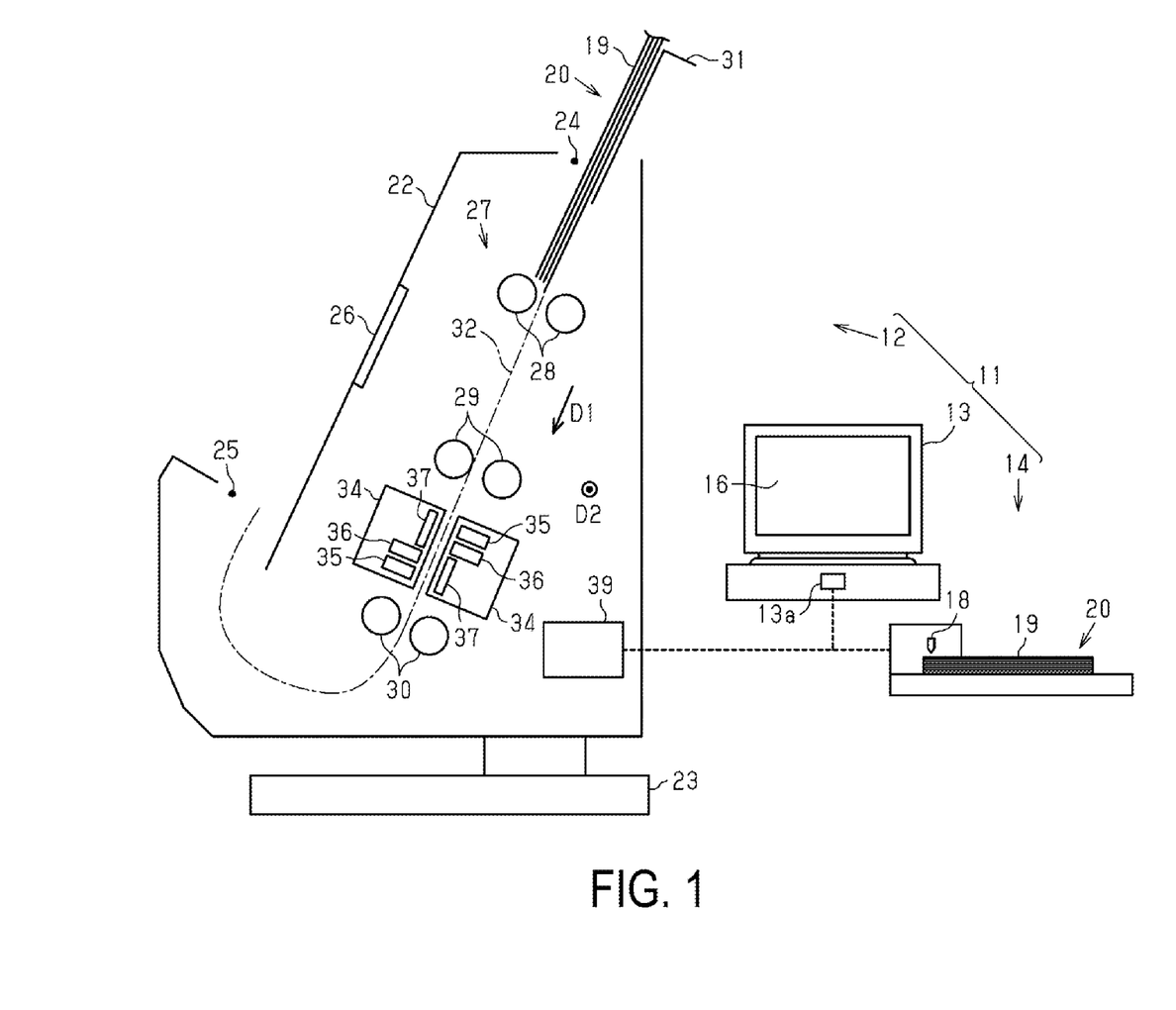
FIG. 1 is a schematic diagram of one embodiment of an image reading system.

As illustrated in FIG. 1, the image reading system 11 includes an image reading apparatus 12 and an external control unit 13a included in an external device 13. The image reading system 11 may include a cutting device 14.

The image reading apparatus 12, the external control unit 13a, and the cutting device 14 may be coupled to each other. That is, the external control unit 13a is coupled to the image reading apparatus 12. The cutting device 14 may be coupled to at least one of the image reading apparatus 12 and the external control unit 13a. The coupling is an electrical connection, is not limited to wired connection, and includes a wireless connection. The image reading apparatus 12, the external control unit 13a, and the cutting device 14 connected to each other can communicate with each other.

The external device 13 may include, for example, a personal computer, a smartphone, a tablet, and the like. The external device 13 may include a display unit 16. The display unit 16 may display an image read by the image reading apparatus 12. The external control unit 13a of the embodiment is a driver installed for communication with the image reading apparatus 12.

The cutting device 14 includes a cutting blade 18. The cutting blade 18 separates a plurality of documents 19 by cutting the plurality of documents 19 bound like a book, for example. In the embodiment, a bundle of the plurality of documents 19 is referred to as a bundle of documents 20. The cutting device 14 can cut the bundle of documents 20 into a designated cutting size. The cutting device 14 may transmit cutting size information to at least one of the image reading apparatus 12 and the external control unit 13a. The cutting size may be input by a user, or may be detected by a detection unit (not illustrated).

Image Reading Apparatus

The image reading apparatus 12 may include a housing 22 and a base 23. The housing 22 is supported on the base 23. The base 23 is, for example, installed on a horizontal plane. A supply port 24 and a discharge port 25 open in the housing 22. The supply port 24 is an opening through which the document 19 is supplied. The document 19 enters inside the housing 22 through the supply port 24. The discharge port 25 is an opening through which the document 19 is discharged. The document 19 is discharged from inside the housing 22 through the discharge port 25.

The image reading apparatus 12 may include an operation unit 26. The operation unit 26 may include, for example, a touch panel, a button, or the like. The operation unit 26 allows the user to operate the image reading apparatus 12.

The image reading apparatus 12 includes a transport unit 27. The transport unit 27 is configured to transport the document 19 from the bundle of cut documents 20 one by one. The transport unit 27 includes, for example, one or more rollers. The transport unit 27 includes, for example, a first roller pair 28, a second roller pair 29, and a third roller pair 30. The transport unit 27 transports the document 19 in a sub-scanning direction D1.

The image reading apparatus 12 has a tray 31. The tray 31 extends from inside the housing 22 to outside the housing 22 through the supply port 24. On the tray 31, the document 19 before reading is set. The bundle of cut documents 20 is set on the tray 31.

The image reading apparatus 12 includes a transport route 32 indicated by an alternating long and short dash line in FIG. 1. The transport route 32 is a route in which the document 19 is transported by the transport unit 27. The transport route 32 extends in the housing 22 from the supply port 24 toward the discharge port 25.

The image reading apparatus 12 includes one or more reading units 34. The reading unit 34 is configured to read an image of the document 19 to be transported. The reading unit 34 reads the document 19 transported through the transport route 32. The reading unit 34 is accommodated in the housing 22.

The image reading apparatus 12 includes, for example, two reading units 34. The two reading units 34 are located with the transport route 32 interposed therebetween. The two reading units 34 face each other. The reading unit 34 is long in a main scanning direction D2. The main scanning direction D2 is a direction different from the sub-scanning direction D1.

Each of the two reading units 34 reads a different surface of the document 19. One of the two reading units 34 reads a front surface of the document 19. The other one of the two reading units 34 reads a back surface of the document 19. In this way, the image reading apparatus 12 reads one surface of the document 19, or both surfaces of the document 19.

The reading unit 34 has a light source 35. The light source 35 is, for example, an LED, a fluorescent lamp, and the like. The light source 35 emits light toward the facing reading unit 34.

The reading unit 34 has a plurality of image sensors 36. The plurality of image sensors 36 are arranged in the main scanning direction D2. The plurality of image sensors 36 are modularized. Each of the plurality of image sensor 36 is, for example, a contact type image sensor. Specifically, each of the image sensors 36 is a CMOS image sensor. The image sensor 36 photoelectrically converts received light. The image sensor 36 outputs an output signal having a value corresponding to a light receiving amount.

The image sensor 36 may be a monochrome sensor, or may be a color sensor. The reading unit 34 may be configured to read the document 19 in full color. For example, the reading unit 34 may be configured to read the document 19 in three colors of RGB. The reading unit 34 may be configured to read the document 19 in grayscale.

The reading unit 34 has a background plate 37. The background plate 37 faces the image sensor 36 and the light source 35 included in another reading unit 34, for example. The background plate 37 is irradiated with light from the light source 35 included in the facing reading unit 34. The background plate 37 reflects the irradiated light. The light reflected by the background plate 37 is incident on the image sensor 36 included in the reading unit 34 that faces the background plate 37. The background plate 37 is read along with the document 19 by the image sensor 36. The background plate 37 is read along with the document 19 by the image sensor 36 as a background.

In the background plate 37, for example, at least a surface facing the image sensor 36 exhibits a colored color excluding white and black colors. The background plate 37 exhibits, for example, gray. The colored color exhibited by the background plate 37 is preferably a color that allows distinguishing between the document 19 and the background when the image sensor 36 reads the background plate 37 together with the document 19. For example, when the frequency of use of the document 19 in which a background color exhibits a blue-based color is high, a color other than a blue-based color is preferably selected as the colored color. For example, when the frequency of use of the document 19 in which the background color exhibits a green-based color is high, a color other than the green-based color is preferably selected as the colored color. For example, when the frequency of use of the document 19 in which the background color exhibits a red-based color is high, a color other than the red-based color is preferably selected as the colored color. In this example, since it is easy to distinguish from the background even in the document 19 exhibiting a chromatic color such as a blue-based color, a green-based color, and a red-based color, as well as a white-based color, gray is employed as an example of the colored color.

The image reading apparatus 12 includes a reading control unit 39. The reading control unit 39 controls the image reading apparatus 12. The reading control unit 39 controls, for example, the transport unit 27, the reading unit 34, and the like. The reading control unit 39 may be configured as a circuit including α: one or more processors that perform various processes according to a computer program, β: one or more dedicated hardware circuits that perform at least some of the various processes, or γ: a combination thereof. The hardware circuit is, for example, an application-specific integrated circuit. The processor includes a CPU and a memory such as RAM and ROM, and the memory stores a program code or a command configured to cause the CPU to perform the process. The memory, that is, a computer readable medium includes all kinds of readable media accessible by a general purpose or dedicated computer.

Figure 2:
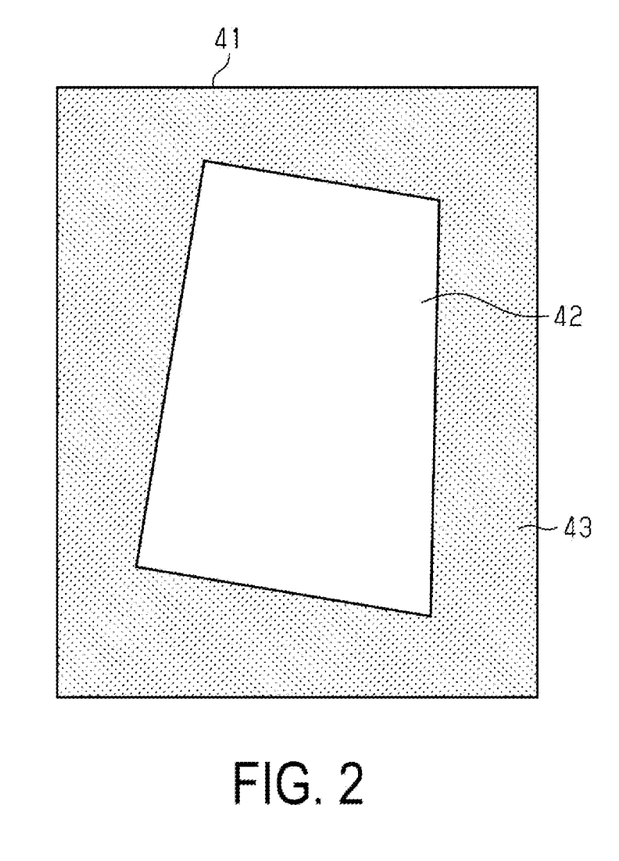
FIG. 2 is a schematic diagram showing an example of image data.

As illustrated in FIG. 2, the reading control unit 39 acquires image data 41 from the reading unit 34. Specifically, the reading control unit 39 receives a detection signal from the reading unit 34. The reading control unit 39 acquires the image data 41 by A/D converting the detection signal. When the image data 41 is acquired, the reading control unit 39 may perform a shading correction and a gamma correction or the like on the detection signal.

The image data 41 includes a document region 42 and a background region 43. The document region 42 is a region that indicates a pixel generated by reading the document 19. The background region 43 is a region that indicates a pixel generated by reading the background plate 37.

The reading control unit 39 detects the document region 42 from the image data 41. Specifically, the reading control unit 39 detects the document region 42 by regarding the pixel indicating a luminance value included in a background range as the background region 43. The background range is a range of the luminance value regarded as the background region 43 in the image data 41.

The reading control unit 39 performs an inclination correction process, a size determination process, and a size correction process. The inclination correction process corrects an inclination of the image of the document 19. The size determination process determines a size of the image as a standard for the bundle of documents 20. The size correction process corrects the size of the image of the document 19 to a specific size determined by the size determination process. That is, an image reading method includes correcting the inclination of the image of the read document 19, determining the specific size of the image as a standard for the bundle of documents 20, and correcting the size of the image of the document 19 to the specific size.

The image reading method is performed by, for example, causing a program to execute a computer. The program may be stored in a storage unit included in the external device 13 or the image reading apparatus 12, or may be stored in a storage medium. The reading control unit 39 performs the inclination correction process, the size determination process, and the size correction process described above by reading out the program.

Inclination Correction Process

Figure 3:
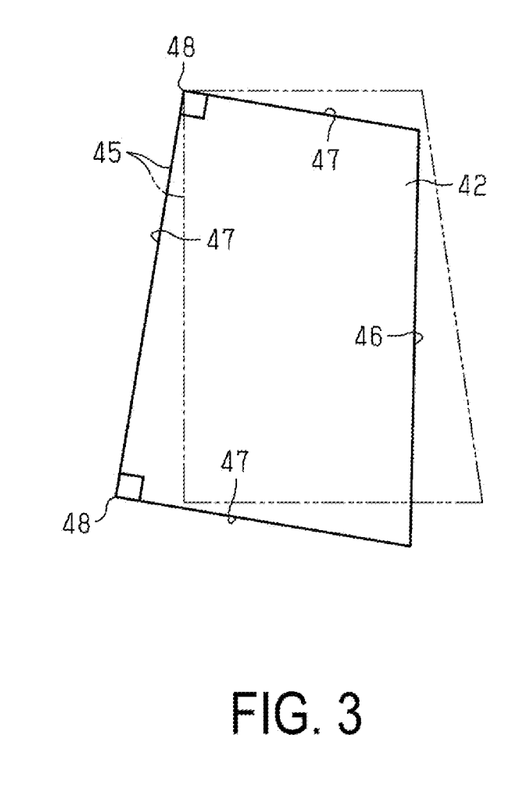
FIG. 3 is a schematic diagram showing an image of a document subjected to inclination correction processing.

As illustrated in FIG. 3, the reading control unit 39 cuts out the document region 42 from the image data 41 and generates an image 45 of the document 19. In the inclination correction process, the reading control unit 39 may identify a cut side 46 which is a side cut out, and a plurality of edge sides 47 different from the cut side 46 from the image 45 of the document 19.

When the bundle of documents 20 is a book or a booklet, the bound back side is cut to become the cut side 46, while the sides located at the edges becomes the edge sides 47. The image 45 has one cut side 46, and three edge sides 47. The reading control unit 39 identifies two of the three edge sides 47, or all the three edge sides 47. The reading control unit 39 may define sides that are orthogonal to each other as the edge sides 47, and may define a side of which an angle with respect to the edge sides 47 is not perpendicular as the cut side 46 among four sides. When all sides are substantially orthogonal to each other, the reading control unit 39 may compare a plurality of images 45 to identify the cut side 46 and the edge sides 47.

The reading control unit 39 may identify the cut side 46 and the edge sides 47 based on information input by the user. For example, the user may input information such as a position of the cut side 46, and whether the bundle of documents 20 is right-bound or left-bound.

The reading control unit 39 corrects an inclination of the image 45 of the document 19 based on an angle 48 formed by two edge sides 47. When the reading control unit 39 identifies the three edge sides 47, the reading control unit 39 corrects the inclination of the image 45 of the document 19 with reference to the angle 48 of two angles 48 formed by the three edge sides 47. The reading control unit 39 affine-transforms and rotates the image 45 around the angle 48, and thus corrects the inclination as indicated by a two-dot chain line in FIG. 3.

Size Determination Process

Figure 4:
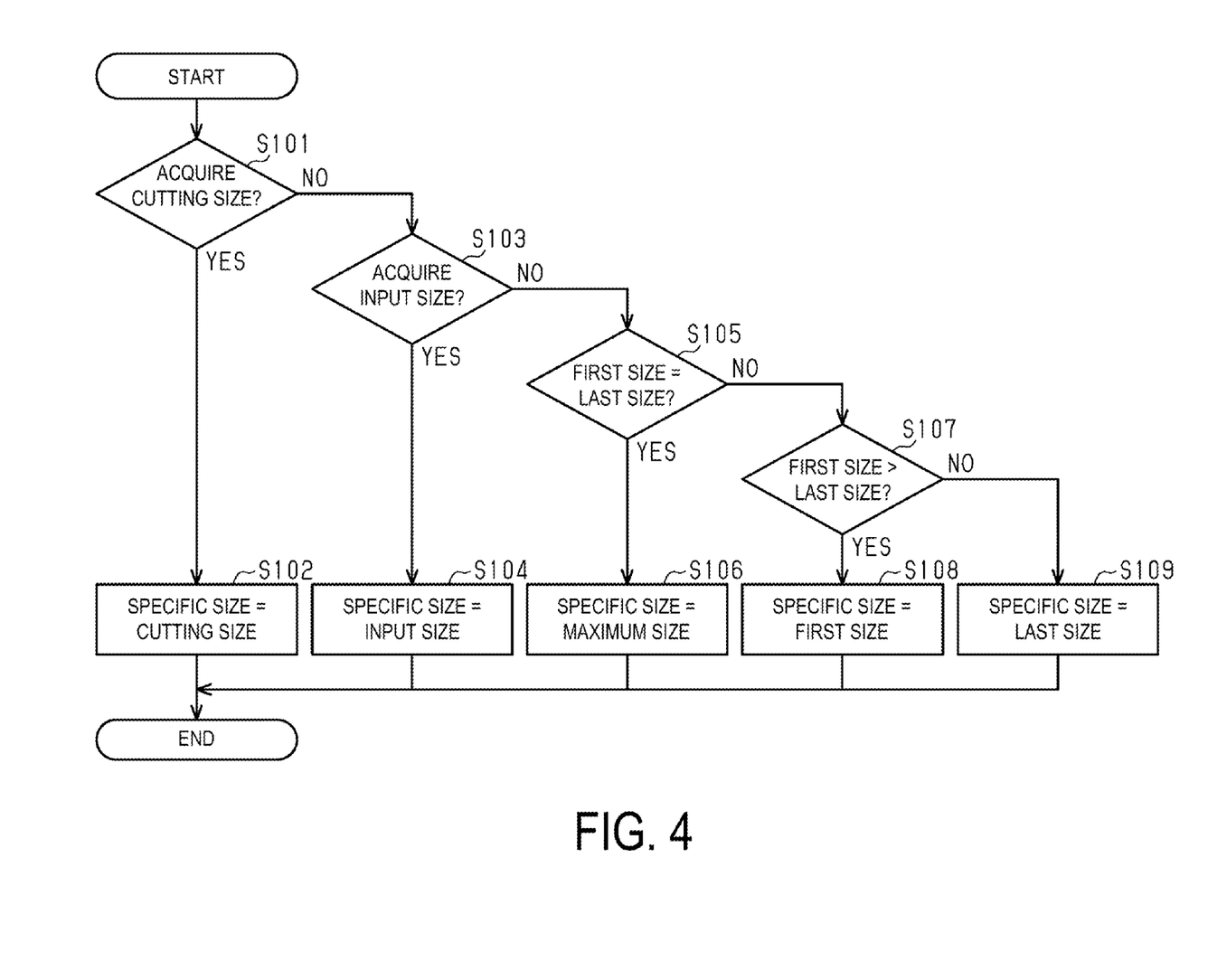
FIG. 4 is a flowchart showing a size determination routine.

In the size determination process, the reading control unit 39 executes a size determination routine illustrated in FIG. 4.

As illustrated in FIG. 4, in Step S101, the reading control unit 39 determines whether a cutting size is acquired from a cutting device 14.

When the cutting size is acquired, Step S101 becomes YES, and the reading control unit 39 shifts the process to Step S102. In Step S102, the reading control unit 39 sets a specific size to the cutting size and ends the size determination process. That is, in the size determination process, the reading control unit 39 may determine a specific size based on the cutting size.

When the cutting size is not acquired, Step S101 becomes NO, and the reading control unit 39 shifts the process to Step S103. In Step S103, the reading control unit 39 determines whether an input size which is the size of the document 19 input by the user is acquired. The reading control unit 39 may acquire the input size from the external control unit 13a, or may be acquired from the operation unit 26.

When the input size is acquired, Step S103 becomes YES, and the reading control unit 39 shifts the process to Step S104. In Step S104, the reading control unit 39 sets a specific size as the input size and ends the size determination process. That is, in the size determination process, the reading control unit 39 may determine the specific size based on the user input.

When the input size is not acquired, Step S103 becomes NO, and the reading control unit 39 shifts the process to Step S105. In Step S105, the reading control unit 39 compares the first size which is the size of the image 45 of the first document 19 and the last size which is the size of the image 45 of the last document 19, among the plurality of images 45 obtained by reading the bundle of documents 20.

When the first size and the last size are the same, Step S105 becomes YES, and the reading control unit 39 shifts the process to Step S106. In Step S106, the reading control unit 39 sets a specific size as the maximum size and ends the size determination process. The maximum size may be a size of the image 45 having the largest surface area, or may be a size of the image 45 having the largest width or height, among the plurality of images 45 obtained by reading the bundle of documents 20.

When the first size and the last size are different, Step S105 becomes NO, and the reading control unit 39 shifts the process to Step S107. In Step S107, whether the first size is larger than the last size is determined.

When the first size is larger than the last size, Step S107 becomes YES, and the reading control unit 39 shifts the process to Step S108. In Step S108, the reading control unit 39 sets a specific size as the first size and ends the size determination process.

When the first size is smaller than the last size, Step S107 becomes NO, and the reading control unit 39 shifts the process to Step S109. In Step S109, the reading control unit 39 sets a specific size as the last size and ends the size determination process.

That is, in the size determination process, the reading control unit 39 may determine a specific size based on the size of the image 45 of the read document 19. The reading control unit 39 may determine a specific size based on the image 45 having the largest size among the plurality of images 45 read from the bundle of documents 20. The reading control unit 39 may determine a specific size based on the size of the image 45 of the first or last document 19 among the bundle of documents 20.

Size Correction Process

Figure 5:
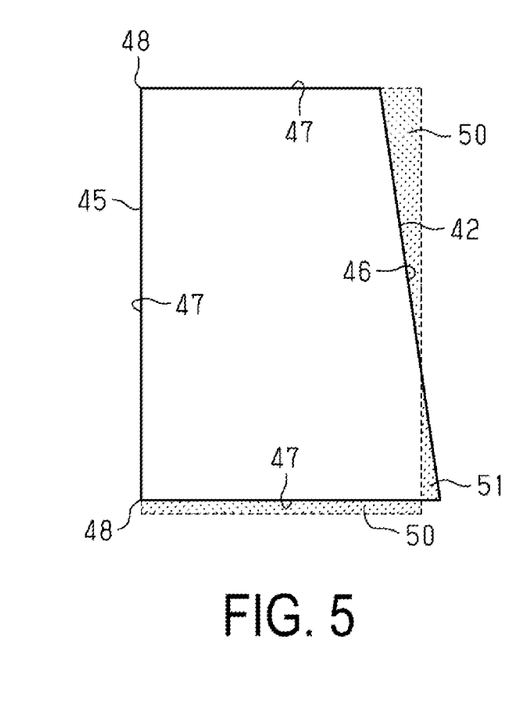
FIG. 5 is a schematic diagram showing an image of a document subjected to size correction processing.

As illustrated in FIG. 5, in the size correction process, the reading control unit 39 may identify a color of the document 19 and may correct the size of the image 45 of the document 19 using the color. The reading control unit 39 may identify the most common color using a histogram and may set the color as the color of the document 19.

The reading control unit 39 compares a specific size indicated by a two-dot dashed line in FIG. 5 based on the angle 48 with the image 45, and identifies an lacking region 50 that lacks for the specific size and a surplus region 51 that overhangs with respect to the specific size. The reading control unit 39 fills the lacking region 50 with an identified color of the document 19 and deletes the surplus region 51.

Actions of Embodiment

Actions of the embodiment will be described.

The transport unit 27 transports the document 19 from the bundle of documents 20 set on the tray 31 one by one. The reading unit 34 may read a front surface and a back surface of the document 19 that is transported. The reading control unit 39 may acquire two image data 41 per one sheet of document 19.

When the cutting size or the input size is acquired, the reading control unit 39 may determine the specific size before the reading of the bundle of documents 20 starts. The reading control unit 39 may performs the inclination correction process and the size correction process in each of the image data 41 of the front surface and the image data 41 of the back surface, and may store the corrected image 45 in a pre-specified format.

When the cutting size and the input size are not acquired, the reading control unit 39 may perform the size determination process after the reading of the bundle of documents 20 ends. The reading control unit 39 may perform the inclination correction process at the timing in which each of the documents 19 is read, and may perform the size correction process after all the documents 19 are read. The reading control unit 39 may perform the inclination correction process and the size correction process after all the documents 19 are read. When the image 45 before the size correction process is performed satisfies the specific size, the image 45 does not need to be subjected to the size correction process.

Effects of Exemplary Embodiment

Effects of the embodiment will now be described.

(1) The plurality of images 45 in which the bundle of documents 20 is read one by one is standardized to a specific size. Therefore, when the plurality of images 45 are displayed on a monitor, the images 45 can be aligned and displayed, and the appearance of the plurality of images 45 displayed can be improved.

(2) For example, when a color of a part of the image 45 is different, there is a risk that the user may have a sense of incompatibility. In this respect, the size correction process corrects the size of the image 45 using the color of the document 19. That is, since a read portion of the document 19 and a corrected portion can be made to have the same color, it is possible to reduce the sense of incompatibility given to the user.

(3) The size determination process determines the specific size based on the user input. Thus, the image 45 can be corrected according to a size intended by the user.

(4) The size determination process determines the specific size based on a size of the image 45 of the read document 19. Therefore, it is possible to increase usability compared to a case in which the user operates.

(5) The size determination process determines the specific size based on the image 45 having the maximum size among the read images 45. Therefore, the image 45 can be corrected according to the maximum size, and the risk of deleting part of the image 45 can be reduced.

(6) When the bundle of documents 20 cut together is read, the size of the first or last document 19 is likely to be maximized. The specific size is determined based on the size of the image 45 of the first or last document 19. Therefore, the specific size can be easily determined compared to a case in which the sizes of all the documents 19 are determined.

(7) The specific size is determined based on a cutting size specified by the cutting device 14. Usability can be improved by linking the image reading apparatus 12 or the external control unit 13a with the cutting device 14

(8) A size of the angle 48 formed by the cut side 46 and the edge side 47 changes according to a cutting method. In that respect, since the inclination is corrected based on the angle 48 formed by the two edge sides 47, it is possible to increase the accuracy of correction compared to a case in which the inclination is corrected based on the angle 48 formed by the cut side 46 and the edge side 47.

Modified Examples

The embodiment described above may be modified as follows. The embodiment and modified examples thereof to be described below may be implemented in combination within a range in which a technical contradiction does not arise.

The cutting device 14 may be coupled so as to transfer the bundle of cut documents 20 to the image reading apparatus 12.

The external control unit 13a may acquire the image data 41 from the image reading apparatus 12. The inclination correction process, the size determination process, and the size correction process may be performed by the external control unit 13a.

The external control unit 13a may perform some of the inclination correction process, the size determination process, and the size correction process. The remaining process may be performed by the image reading apparatus 12.

The image reading apparatus 12 may include a size detection unit such as, for example, a lever sensor that detects the size of the document 19. The size detection unit may be provided in the tray 31 or the transport route 32. In the size determination process, the reading control unit 39 may determine the specific size based on detection results of the size detection unit.

The reading control unit 39 may perform the size correction process before the inclination correction process is performed. The size correction process may be performed such that the cut side 46 is perpendicular to the edge sides 47. In the inclination correction process, the reading control unit 39 may correct the inclination of the image 45 of the document 19 based on any one of the angles.

The image reading apparatus 12 may perform reading of the bundle of documents 20, for example, cut by the user with a cutter, regardless of the cutting device 14.

The reading control unit 39 may determine the specific size to an average size of the images 45 obtained by reading the bundle of documents 20. The reading control unit 39 may determine the specific size as the minimum size of the image 45 obtained by reading the bundle of documents 20. The reading control unit 39 may determine the specific size as any size between the maximum size and the minimum size in the images 45 obtained by reading the bundle of documents 20.

The reading control unit 39 may identify the most common color using a histogram and may correct this color to a certain color such as white, for example. In the size correction process, the reading control unit 39 may correct the lacking region 50 to a certain color.

Supplementary Note

Hereinafter, technical concepts and effects thereof that are understood from the above-described embodiments and modified examples will be described.

(A) An image reading system includes an image reading apparatus including a transport unit that transports a document from a bundle of cut documents one by one, a reading unit that reads an image of the transported document, and a reading control unit, and an external control unit included in an external device coupled to the image reading apparatus, wherein an inclination correction process that corrects an inclination of the image of the document, a size determination process that determines a size of the image as a standard for the bundle of documents, and a size correction process that corrects the size of the image of the document to a specific size determined by the size determination process are performed.

According to such a configuration, a plurality of images in which the bundle of documents is read one by one is standardized to a specific size. Therefore, when the plurality of images is displayed on a monitor, the images can be aligned and displayed, and an appearance of the plurality of images displayed can be improved.

(B) In the size correction process, the image reading system may identify a color of the document and may correct the size of the image of the document using the color.

For example, when the color of a part of the image is different, there is a possibility that the user may have a sense of incompatibility. In this respect, according to such a configuration, the size correction process corrects the size of the image using the color of the document. That is, it is possible to match colors of a read portion and a corrected portion of the document, thereby reducing the sense of incompatibility given to the user.

(C) In the size determination process, the image reading system may determine the specific size based on a user input.

According to such a configuration, the size determination process determines the specific size based on the user input. Thus, the image can be corrected according to the size intended by the user.

(D) In the size determination process, the image reading system may determine the specific size based on the size of the image of the read document.

According to such a configuration, the size determination process determines the specific size based on the size of the image of the read document. Therefore, it is possible to increase usability compared to a case in which the user operates.

(E) In the size determination process, the image reading system may determine the specific size based on an image having the maximum size among the plurality of images obtained by reading the bundle of documents.

According to such a configuration, the size determination process determines the specific size based on the image having the maximum size among the read images. Therefore, the image can be corrected according to the maximum size, and the risk of deleting part of the image can be reduced.

(F) In the size determination process, the image reading system may determine the specific size based on the size of the image of the first or last document among the bundle of documents.

When the bundle of documents cut together is read, the size of the first or last document is likely to be maximized. According to such a configuration, the specific size is determined based on the size of the image of the first or last document. Therefore, the specific size can be easily determined compared to a case in which the sizes of all the documents are determined.

(G) The image reading system may further include a cutting device that cuts the bundle of documents into a designated cutting size, the cutting device being coupled to at least one of the image reading apparatus and the external control unit, and in the size determination process, the specific size may be determined based on the cutting size.

According to such a configuration, the specific size is determined based on the cutting size designated by the cutting device. Usability can be improved by linking the image reading apparatus or the external control unit with the cutting device.

(H) In the inclination correction process, the image reading system may identify a cut side that is a side cut out, and a plurality of edge sides different from the cut side from the image of the document, and may correct the inclination of the image of the document based on an angle formed by two edge sides.

A size of an angle formed by the cut side and the edge side is changed by a cutting method. In this respect, according to such a configuration, since the inclination is corrected based on the angle formed by the two edge sides, it is possible to increase accuracy of correction compared to a case in which the inclination is corrected based on the angle formed by the cut side and the edge side.

(I) An image reading method includes correcting an inclination of the image of the document read by the image reading apparatus including a transport unit that transports a document from a bundle of cut documents one by one and a reading unit that reads an image of the transported document, determining a specific size of the image as a standard for the bundle of documents, and correcting a size of the image of the document to the specific size. According to the method, the same effects as those of the image reading system can be obtained.

(J) A non-transitory computer-readable storage medium storing a program processed by a computer provided in an image reading apparatus including a transport unit that transports a document from a bundle of cut documents one by one and a reading unit that reads an image of the transported document, and an external device coupled to the image reading apparatus, wherein correcting an inclination of an image of a read document, determining a specific size of the image as a standard for a bundle of documents, and correcting a size of the image of the document to the specific size are performed. According to the program, the same effects as those of the image reading system can be obtained.

(K) An image reading apparatus includes a transport unit that transports a document from a bundle of cut documents one by one, a reading unit that reads an image of the transported document, and a reading control unit, wherein the reading control unit performs an inclination correction process that corrects an inclination of the image of the document, a size determination process that determines a size of the image as a standard for the bundle of documents, and a size correction process that corrects the size of the image of the document to a specific size determined by the size determination process. According to such a configuration, the same effects as those of the image reading system can be obtained.

What is claimed is:

1. An image reading system comprising:
    an image reading apparatus including a transport unit configured to transport a document from a bundle of cut documents one by one, a reading unit configured to read an image of the transported document, and a reading control unit; and
    an external control unit included in an external device coupled to the image reading apparatus, wherein
    at least one of the reading control unit and the external control unit performs an inclination correction process that corrects an inclination of the image of the document, a size determination process that determines a size of the image as a standard for the bundle of documents, and a size correction process that corrects the size of the image of the document to a specific size determined by the size determination process,
    wherein the reading control unit is configured to fill a lacking region representative of a difference between the specific size and the image with a color of the document as identified from a histogram of the image and deleting a surplus region representative of a portion of the image that is larger than the specific size.

2. The image reading system according to claim 1, wherein, in the size determination process, the specific size is determined based on a user input.

3. The image reading system according to claim 1, wherein, in the size determination process, the specific size is determined based on the size of the image of the read document.

4. The image reading system according to claim 3, wherein, in the size determination process, the specific size is determined based on an image having a maximum size among a plurality of images obtained by reading the bundle of documents.

5. The image reading system according to claim 3, wherein in the size determination process, the specific size is determined based on a size of an image of a first or last document among the bundle of documents.

6. The image reading system according to claim 1, further comprising a cutting device configured to cut the bundle of documents into a cutting size, the cutting device being coupled to at least one of the image reading apparatus and the external control unit, wherein, in the size determination process, the specific size is determined based on the cutting size.

7. The image reading system according to claim 1, wherein in the inclination correction process, a cut side that is a side cut out, and a plurality of edge sides different from the cut side are identified from the image of the document, and the inclination of the image of the document is corrected based on an angle formed by two edge sides.

8. An image reading method comprising:
    correcting an inclination of an image of a document read by an image reading apparatus including a transport unit configured to transport a document from a bundle of cut documents one by one and a reading unit configured to read an image of the transported document;
    determining a specific size of the image as a standard for the bundle of documents; and
    correcting a size of the image of the document to the specific size,
    wherein the reading control unit is configured to fill a lacking region representative of a difference between the specific size and the image with a color of the document as identified from a histogram of the image and deleting a surplus region representative of a portion of the image that is larger than the specific size.

9. The image reading method according to claim 8, comprising determining the specific size is based on a user input.

10. The image reading method according to claim 8, wherein, in determining the specific size of the image as a standard for the bundle of documents, the specific size is determined based on the size of the image of the read document.

11. The image reading method according to claim 8, wherein in determining the specific size of the image as a standard for the bundle of documents, the specific size is determined based on an image having a maximum size among a plurality of images obtained by reading the bundle of documents.

12. The image reading method according to claim 10, wherein, in determining the specific size of the image, the specific size is determined based on a size of an image of a first or last document among the bundle of documents.

13. The image reading method according to claim 8, wherein, in correcting the inclination of the image of the document, a cut side that is a side cut out, and a plurality of edge sides different from the cut side are identified from the image of the document, and the inclination of the image of the document is corrected based on an angle formed by two edge sides.

14. A non-transitory computer-readable storage medium storing a program processed by a computer provided in an image reading apparatus including a transport unit configured to transport a document from a bundle of cut documents one by one, and a reading unit configured to read an image of the transported document, and an external device coupled to the image reading apparatus, wherein correcting an inclination of an image of a read document, determining a specific size of the image as a standard for the bundle of documents, and correcting a size of the image of the document to the specific size are performed, wherein the reading control unit is configured to fill a lacking region representative of a difference between the specific size and the image with a color of the document as identified from a histogram of the image and deleting a surplus region representative of a portion of the image that is larger than the specific size.

\* \* \* \* \*